INVENTORS
Allan D. Martin
Irving S. Houvener

INVENTORS
Allan D. Martin
Irving S. Houvener

United States Patent Office 3,283,364
Patented Nov. 8, 1966

3,283,364
EXTRUSION APPARATUS AND METHOD
Allan D. Martin, Sanford, and Irving S. Houvener, Houghton Lake, Mich., assignors to The Dow Chemical Company, Midland, Mich., a corporation of Delaware
Continuation of application Ser. No. 141,162, Sept. 27, 1961. This application Oct. 26, 1964, Ser. No. 406,274
2 Claims. (Cl. 18—12)

This invention relates to a method and apparatus for fabrication of flat webbing. It is a continuation of application Serial Number 141,162 filed September 27, 1961, now Patent No. 3,172,154.

While any material which is extrudable may be used in practicing the invention, plastic materials such as normally solid polyolefins, particularly polyethylene, polypropylene, copolymers of ethylene and propylene and the like, polystyrene and nylon, may be most advantageously utilized.

In the copending application of Allan D. Martin, Serial No. 141,161, filed September 27, 1961, now abandoned, a method and apparatus is disclosed for fabrication of webbing extruded in flat continuous lengths. While the end product of this disclosure and that of the copending application may be similar, the apparatus of the copending application bears little resemblance to that herein disclosed.

The type of product under consideration is relatively new in the art of plastic extrusion. Reference may be made to U.S. Patent 2,919,467, issued January 5, 1960, to F. B. Mercer, which discloses a method and apparatus for fabrication of plastic net-like structures. While the teachings of the Mercer patent and those of the present disclosure have certain objectives in common, the method, apparatus and product disclosed herein differ significantly from that of the Mercer patent. Considering the product, that produced by the apparatus of Mercer is obtained in effect, by longitudinally splitting or shearing extruded strands of material as they move from an extrusion nozzle. Predetermined lengths of each strand are left unsplit whereby adjoining strands will be interconnected in a manner as to form a net-like structure.

In the product produced by apparatus of the present invention, the strands making up the web-like structure are extruded with a uniform thickness in a predesignated manner to achieve a web-like product. Irrespective of the relative merits of the comparative products under consideration, the principles of the present invention provide greater flexibility in product. The apparatus of the present invention may likewise be used to achieve a great variety of web patterns, as with the apparatus of the Mercer patent.

The main object of this invention is to provide a method and apparatus for producing webbing in a continuous extrusion operation.

Another object of the invention is to provide a method and apparatus for producing plastic webbing in a continuous extrusion operation wherein the pattern of the webbing may be varied.

These and further objects and features of the invention will become more apparent from the following description and accompanying drawings wherein.

Figure 1:
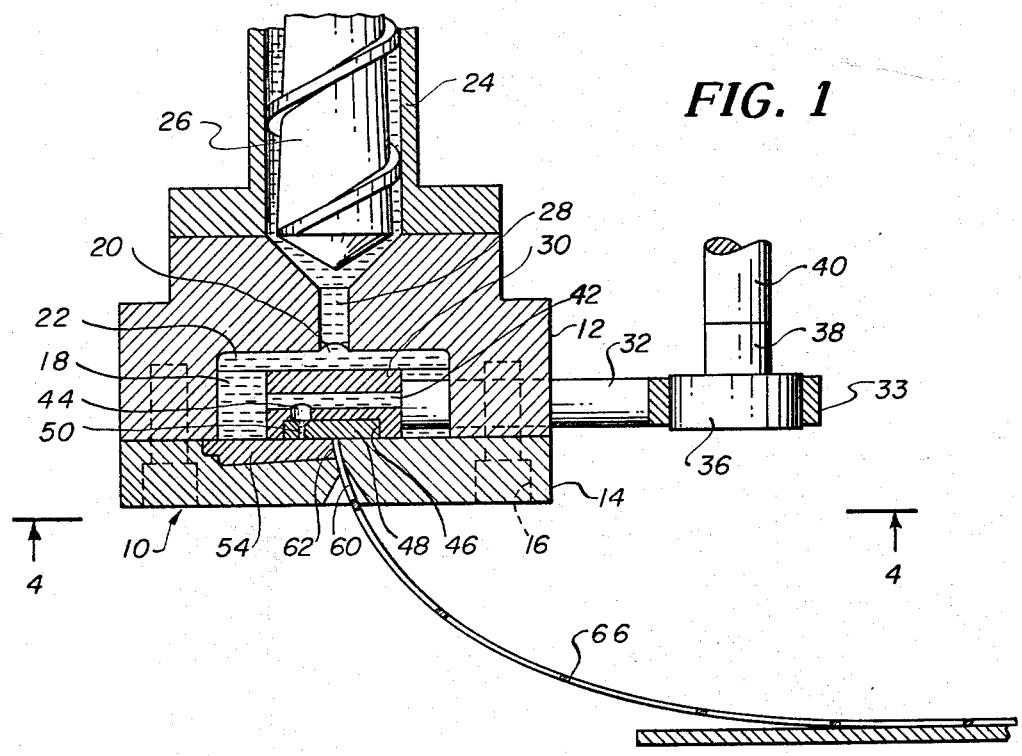
FIGURE 1 is a side sectional elevation view of apparatus embodying the principles of the invention.
Figure 2:
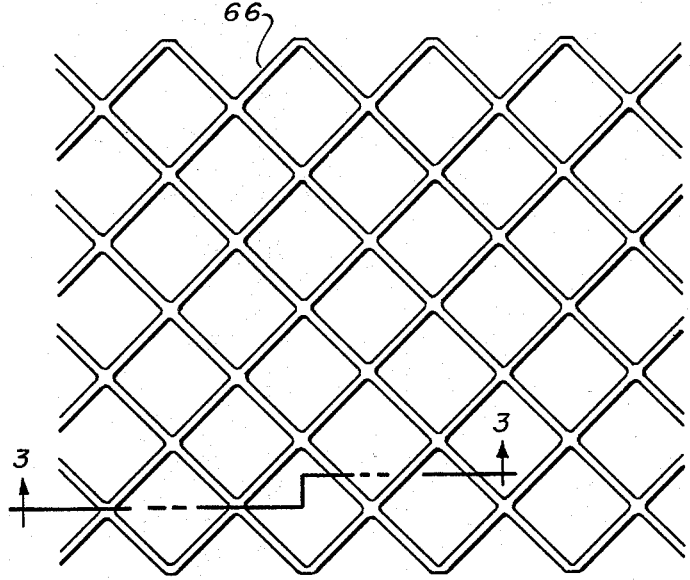
FIGURE 2 is a top view of webbing (netting) as produced by the apparatus of FIG. 1.
Figure 3:
FIGURE 3 is a section view generally as seen from line 3—3 in FIG. 2.
Figure 4:
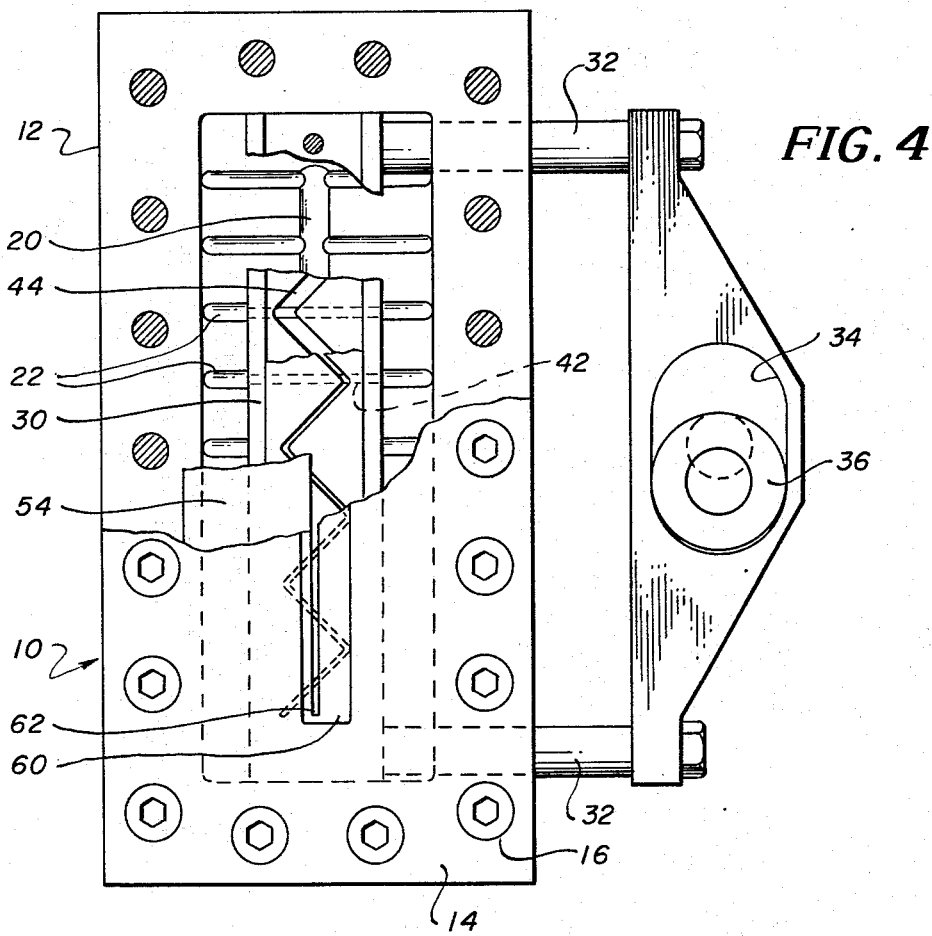
FIGURE 4 is a view generally seen along line 4—4 in FIG. 1, but with a portion of the apparatus removed.
Figure 5:
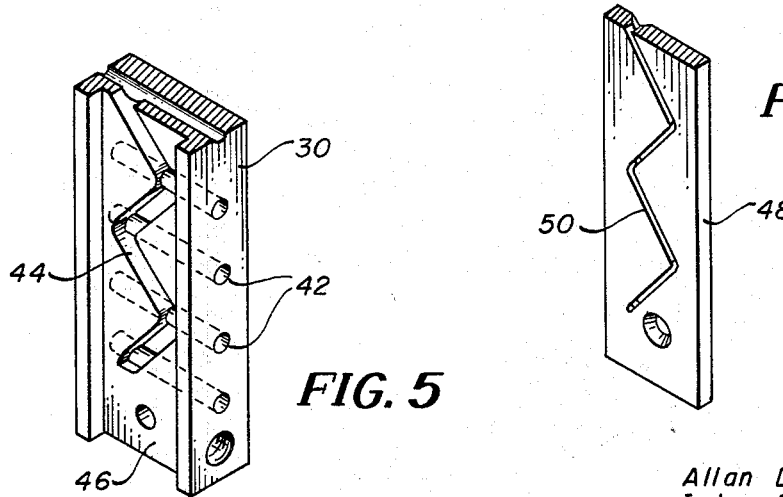
FIGURE 5 is a perspective-like view of a plate body used in the apparatus of FIG. 1.
Figure 6:
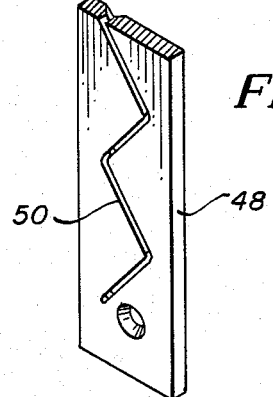
FIGURE 6 is a perspective-like view of a rib forming nozzle used in the apparatus of FIG. 1.

Referring now to the drawings, the numeral 10 identifies an extruder assembly embodying the principles of the invention, which includes a body member 12 having a face plate 14 secured thereto by fastening means, such as cap screws 16. The body member 12 has a longitudinal cavity 18 which is enclosed by the face plate 14. On the bottom, or inner surface of the cavity 18, is a gate defined by a groove 20 extending substantially the full length of the cavity, and a plurality of parallel arranged distributing grooves 22 which intersect and extend perpendicular to the gate 20 the full width of the cavity 18. A barrel 24 of an extruder (not shown) is affixed to the body member 12, so that plastic material may be forced by an extruder screw 26 into a sprue 28 formed in the body member. The sprue 28, which receives the end of the screw 26, opens into the groove 20.

A rib forming plate body 30 is mounted for reciprocal movement in the cavity 18, which movement is provided by a pair of connecting rods 32 extending through one wall of the body 12 and secured to a yoke 33. The yoke has an elongated hole 34 for receipt of a cam 36 affixed to an offset end 38 of a drive shaft 40. Motor means (not shown) is arranged to rotate the drive shaft 40 whereby reciprocal movement of the plate body 30 is effected. The rib forming plate body 30 is provided with a plurality of flow control orifices in the form of passageways 42 which extend the full width of the plate body and intersect a gate defined by an irregular, or zig-zag groove 44 extending the length of the plate body. Mounted within a longitudinal recess 46 formed in the plate body 30, is a rib forming nozzle plate 48 having an irregular or zig-zag opening 50, which conforms with the shape and length of groove 44, but which is of somewhat narrower width. The thickness of the plate body 30, including the outside surface of the nozzle plate 48, is substantially equal to the depth of the cavity 18 so as to provide a sliding fit between the outer surface of the nozzle plate 48 and the inner surface of the face plate 14, with minimum leakage therebetween.

The face plate 14 is formed to provide a stationary rib forming nozzle 60 which flares outwardly from a relatively narrow slot 62 defined in part by the edge of the nozzle plate 54.

It will be seen that plastic material delivered under pressure to the cavity 18 will be extruded through the reciprocated zig-zag opening 50 at every point of juncture with the slot 62, to form a criss-cross rib pattern 66.

The stroke of the plate body 30 is no greater than the vertical distance (in the direction of the movement) between the vertexes of the zig-zag opening 50. It should be apparent that the web pattern shown is only one of many which may be extruded. By varying the shape of the opening 50, other web patterns may be produced. Other factors affect the web pattern, such as the rate of extrusion relative to the speed of reciprocation of the plate body 30, as well as the stroke of the plate body relative to the width of the opening 50.

Upon leaving the extruder assembly 10, the extrudate may be passed through a liquid bath, or be air cured, which techniques are well known to those skilled in the art.

From the foregoing it will be realized that the disclosed embodiment of the invention will satisfy the objectives set forth hereinbefore.

The foregoing description has been given in detail without thought of limitation since the inventive principles involved are capable of assuming other forms without departing from the spirit of the invention or the scope of the following claims.

What is claimed is:

1. Apparatus for fabricating flat webbing consisting of means to extrude material in fluid form, a body with a cavity therein and formed with a slot in one of its walls, said cavity communicating with said extrusion means, nozzle means slidably arranged along a plane within said cavity, said nozzle means being formed to provide an irregular shaped groove and means for causing reciprocal movement of said nozzle means along said plane to cause movement of said groove past said slot whereby ribbons of plastic material will be extruded through every point of intersection between the groove and the slot to form a flat webbing.

2. The apparatus of claim 1 wherein said irregular shaped groove has a sawtooth configuration.

References Cited by the Examiner

UNITED STATES PATENTS

| | | |
|---|---|---|
| 3,070,840 | 1/1963 | Mercer. |
| 3,112,526 | 12/1963 | Martin. |
| 3,172,154 | 3/1965 | Martin et al. _____ 264—177 X |

FOREIGN PATENTS 1,109,131  6/1961  Germany.

WILLIAM J. STEPHENSON, *Primary Examiner.*

ALFRED L. LEAVITT, *Examiner.*